Patented July 29, 1924.

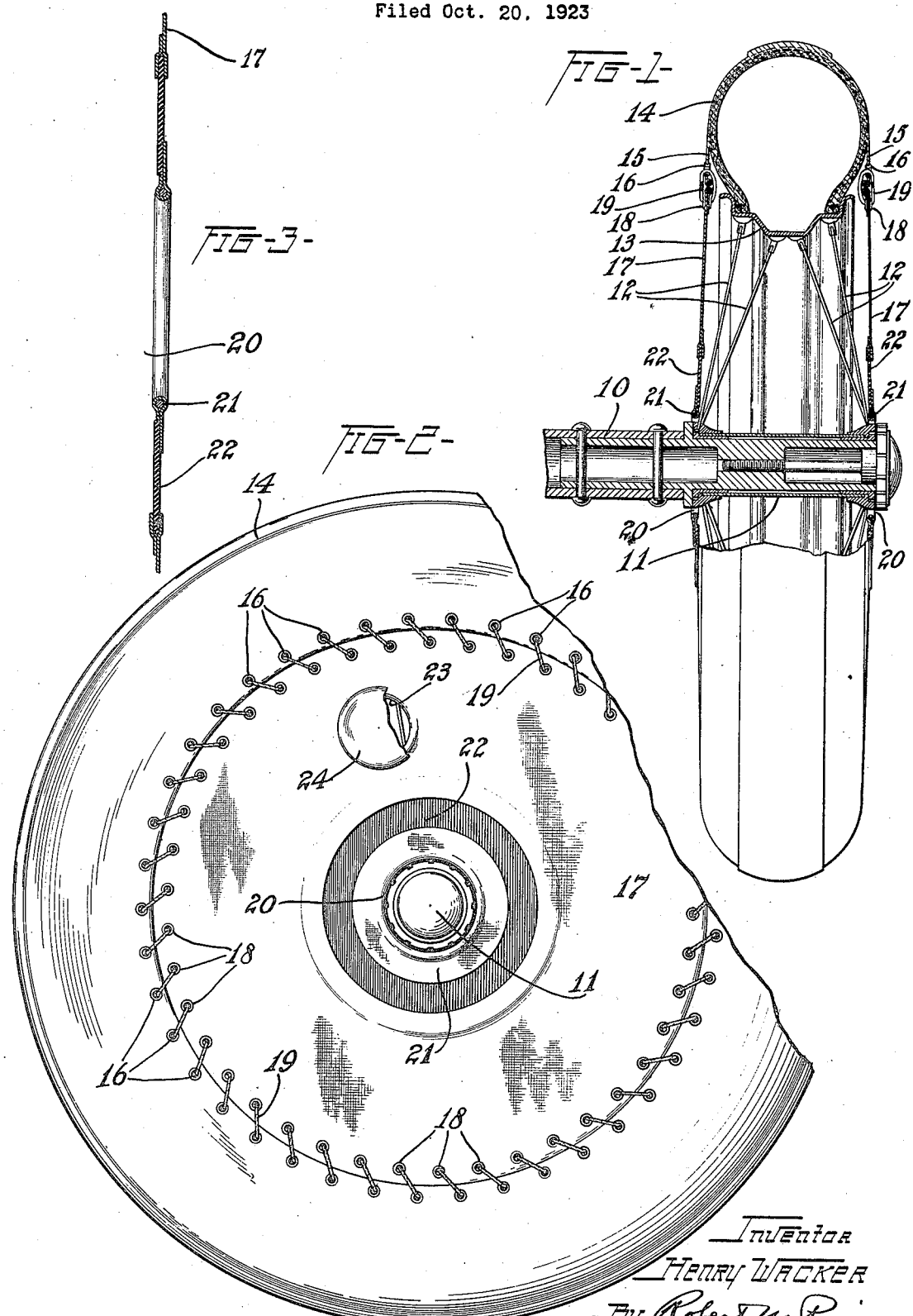

1,503,397

UNITED STATES PATENT OFFICE.

HENRY WACKER, OF AKRON, OHIO, ASSIGNOR TO THE B. F. GOODRICH COMPANY, OF NEW YORK, N. Y., A CORPORATION OF NEW YORK.

FACING COVER FOR WHEEL ASSEMBLIES.

Application filed October 20, 1923. Serial No. 669,705.

*To all whom it may concern:*

Be it known that I, HENRY WACKER, a citizen of the United States, residing at Akron, in the county of Summit and State of Ohio, have invented certain new and useful Facing Covers for Wheel Assemblies, of which the following is a specification.

This invention relates to streamline covers or facings for wheels such as the landing-wheels of aeroplanes, such covers being used to reduce the wind resistance of the wheel, and to protect the spokes and adjacent parts from mud, water or loose sand which may be encountered upon landing.

The covers or facings preferably are made of rubberized cloth, in the form of disks, and are detachably secured about their outer margins to the pneumatic tires, with which the wheels are usually equipped, in any suitable manner, as by lacing their respective peripheries to circumferential flaps or skirts formed integral with the respective side walls of the tires. The facing on the inner side of the wheel must be centrally apertured to accommodate the axle or inner end of the wheel hub. It is desirable that the axial aperture in the facing, through which the axle or wheel hub extends, be as small as possible to prevent the disruption of the stream lines of air as they flow over said facing, but when the aperture closely fits the hub or axle, in constructions heretofore employed, relative movement between the axle and facing, such as may be caused by landing shocks or heavy loading, allows the axle to engage the facing where it passes through the latter, and to strain, tear, or otherwise damage the facing.

The chief object of my invention is to provide a facing which will locally absorb the force imparted by contact with the axle, thereby avoiding excessive strain on the lacing, or adjacent portions of the facing, and on the tire flaps to which the facing is attached. A further object is to provide a facing which, while thus locally yielding under radial displacement of the axle, will not substantially depart from a plane form under the force of wind pressure.

Of the accompanying drawings:

Fig. 1 is an edge view, partly in section, of a pneumatic-tired wheel provided with a pair of my improved facing covers.

Fig. 2 is a side elevation of the same, partly broken away.

Fig. 3 is a detail section showing the central aperture and adjacent parts of the cover.

Referring to the drawings, 10 represents a wheel axle having mounted thereon a hub 11 provided with spokes 12 and a rim 13. A pneumatic tire casing 14 formed with integral flaps or skirts 15, 15 extending from its respective side walls, is mounted upon the rim 13, the margins of said flaps being provided with metal eyelets 16, 16. The inner air tube for the tire is omitted from the illustration.

Each facing cover comprises an annular disk 17 of rubberized fabric, having in its outer peripheral margin a series of eyelets 18, 18, by which it is detachably secured to the respective tire flap 15 by means of lacing 19. In the specific embodiment here shown, both inner and outer facings are formed with central apertures 20, 20, to accommodate the wheel axle 10 and the hub 11. The central aperture 20 is defined by a beaded, reinforced, annular member 21, of rubberized fabric, and a concentric, annular insert 22 of elastic material such as rubber is incorporated in the facing, surrounding the member 21, being attached thereto and to the disk 17 by stitching, cementing or in any other suitable manner.

When relative movement between the axle or hub and the disks 17 causes said axle or hub to contact the member 21 and displace the same, the force of such displacement is absorbed by the elastic insert 22, thereby avoiding excessive distortion of or strain upon all other parts of the facing and on the lacing 19 and flap 15.

The outer disk 17 is formed with a hand-hole 23 adjacent the valve stem of the tire 14, said hand-hole being suitably reinforced to receive and frictionally bind the stem of a mushroom plug or closure member 24, to hold the latter in place, the head of said plug being of disk-like form, adapted to lie flatly against the face of the disk to avoid wind resistance.

When the rubber insert 22, as here shown, closely surrounds the central aperture of the cover, it may be of small area although providing sufficient resilience radially of the wheel, so that air pressure tending to distort it is not of great force, the strong, fabric disk member 17 sustaining nearly all of the air-current force applied to the cover, whereas the insert would be subjected to greater distorting strains from pressure of the air if it were of larger outside diameter, even though narrow in segmental cross-section. Consequently, in the structure as here shown, the entire cover is held substantially in plane form by the relatively wide, strong member 17, while radial forces of the axle are absorbed by the rubber insert.

My invention may be modified within its scope, and I do not wholly limit my claims to the exact construction shown.

I claim:

1. A facing for a wheel assembly, said facing comprising a disk-like structure adapted to be secured, about its outer margin, to a part of said wheel assembly, apertured at its center to accommodate an axle or a hub, and having an elastic, annular zone about its central aperture.

2. A facing for a wheel assembly, said facing comprising a durable, annular, disk-like member adapted to be secured, about its outer margin, to a pneumatic tire, and an annular structure of elastic material secured, about its outer margin, to the inner margin of said member and centrally apertured to accommodate an axle or a hub.

3. A facing for a wheel assembly, said facing comprising a durable, annular, disk-like member adapted to be secured, about its outer margin, to a pneumatic tire, a durable, annular member adapted to accommodate an axle or a hub in its central aperture, and an elastic, annular member interposed between and joined at its respective margins to the two aforesaid members.

4. A facing for a wheel assembly, said facing comprising an annular fabric disk having a reinforced axial aperture, and a concentric elastic insert closely surrounding said aperture.

5. A facing for a wheel assembly, said facing comprising an annular fabric disk adapted to be secured about its outer margin to a part of said wheel assembly, a relatively small, reinforced, annular, fabric member adapted to accommodate an axle or a hub, and a concentric rubber insert interposed between and secured to said disk and said reinforced member.

In witness whereof I have hereunto set my hand this 12th, day of October, 1923.

HENRY WACKER.